United States Patent
Oshida et al.

(10) Patent No.: US 10,305,338 B2
(45) Date of Patent: May 28, 2019

(54) ROTOR FOR ROTATING ELECTRIC MACHINE AND ROTATING ELECTRIC MACHINE INCLUDING THE ROTOR

(71) Applicant: HITACHI AUTOMOTIVE SYSTEMS, LTD., Hitachinaka-shi, Ibaraki (JP)

(72) Inventors: Manabu Oshida, Hitachinaka (JP); Satoshi Yamamura, Hitachinaka (JP); Ryoji Kobayashi, Hitachinaka (JP); Yuichiro Baba, Hitachinaka (JP); Yuji Saito, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 80 days.

(21) Appl. No.: 15/512,995

(22) PCT Filed: Aug. 17, 2015

(86) PCT No.: PCT/JP2015/072984
§ 371 (c)(1),
(2) Date: Mar. 21, 2017

(87) PCT Pub. No.: WO2016/047311
PCT Pub. Date: Mar. 31, 2016

(65) Prior Publication Data
US 2017/0302116 A1  Oct. 19, 2017

(30) Foreign Application Priority Data
Sep. 25, 2014 (JP) .................................. 2014-194622

(51) Int. Cl.
*H02K 1/27* (2006.01)
*H02K 1/30* (2006.01)

(52) U.S. Cl.
CPC ............... *H02K 1/276* (2013.01); *H02K 1/30* (2013.01); *H02K 2201/00* (2013.01)

(58) Field of Classification Search
CPC ............ H02K 1/27; H02K 1/30; H02K 1/276; H02K 2201/00
(Continued)

(56) References Cited

U.S. PATENT DOCUMENTS

2012/0133229 A1  5/2012  Jayasoma et al.
2013/0020897 A1*  1/2013  Takizawa ............... H02K 1/276
                                              310/156.01
(Continued)

FOREIGN PATENT DOCUMENTS

JP  2009-011011 A  1/2009
JP  2013-208014 A  10/2013
JP  2014-158331 A  8/2014

OTHER PUBLICATIONS

International Search Report, PCT/JP2015/072984, dated Nov. 24, 2015, 2 pgs.

*Primary Examiner* — Naishadh N Desai
(74) *Attorney, Agent, or Firm* — Volpe and Koenig, P.C.

(57) ABSTRACT

A rotor for a rotating electric machine has interference and lightening holes. The rotor includes a shaft and a rotor iron core. The shaft is press fitted in the rotor iron core. The rotor iron core includes a shaft hole, an outer area, an inner area in which the shaft is press fitted, a plurality of ribs connecting the outer area and the inner area. Each of the ribs includes a plurality of outer rib joints adjacent to the outer area, a plurality of outer rib portions adjacent to the outer area, a plurality of inner rib joints adjacent to the inner area, and a plurality of inner rib portions adjacent to the inner area. The outer rib portions are connected to the inner rib (Continued)

portions and the total number of the inner rib joints is larger than that of the outer rib joints.

6 Claims, 8 Drawing Sheets

(58) Field of Classification Search
USPC .......... 310/156.01, 216.053, 67 A, 420, 421
See application file for complete search history.

(56) References Cited

U.S. PATENT DOCUMENTS

| 2013/0091902 A1* | 4/2013 | Hill | D06F 37/30 68/140 |
| 2014/0225470 A1 | 8/2014 | Yamaguchi et al. | |

* cited by examiner

US 10,305,338 B2

ROTOR FOR ROTATING ELECTRIC MACHINE AND ROTATING ELECTRIC MACHINE INCLUDING THE ROTOR

TECHNICAL FIELD

The present invention relates to a rotor for a rotating electric machine and a rotating electric machine including the rotor.

BACKGROUND ART

There is known a rotor for a rotating electric machine including a rotor iron core having a shaft hole in which a shaft is press fitted for securing (See PTL 1, for example).

FIG. 1 is a cross-sectional view of a conventional rotor. A rotating electric machine includes a stator (not shown) and a rotor 300. The rotor 300 includes a rotor iron core 400 and a shaft 500. The rotor iron core 400 is made of a stack of flat rolled magnetic steel sheets.

The rotor iron core 400 has a shaft hole 410 at the center. The shaft 500 is press fitted in the shaft hole. The rotor iron core 400 has a plurality of lightening holes 450 for reducing moment of inertia. The rotor iron core 400 includes an inner area 420 surrounding the shaft hole 410, the lightening holes 450 surrounding the inner area 420, an outer area 440 surrounding the lightening holes 450, and a plurality of ribs 430 connecting the inner area 420 and the outer area 440.

CITATION LIST

Patent Literature

PTL 1: JP 2009-11011 A

SUMMARY OF INVENTION

Technical Problem

Recently, a rotating electric machine has been required to withstand high-speed rotation and reduce moment of inertia.

To withstand high-speed rotation, it is necessary to widen an interference of a rotor iron core; however, a wide interference causes the increase in the stress around the internal circumference of the rotor iron core. Large lightening holes broadening toward the internal circumference of a rotor iron core to reduce moment of inertia also cause the increase in the stress around the internal circumference of the rotor iron core. A rotor iron core made of high-strength material can solve these problem; however, such a rotor iron core causes the increase in the costs.

An object of the present invention is to provide a rotor for a rotating electric machine including a shaft and a rotor iron core, and a rotating electric machine including the rotor. In the rotor, the shaft is press fitted in the rotor iron core for securing, and the rotor iron core has lightening holes. The rotor achieves low costs while having an interference and lightening holes.

Solution to Problem

To solve the above problems, the present invention adopts the structures defined in the claims, for example.

The present application includes a plurality of means for solving the above problems, and for example, a rotor for a rotating electric machine includes: a shaft and a rotor iron core, the shaft being press fitted in the rotor iron core. The rotor iron core includes: a shaft hole; an outer area; an inner area in which the shaft is press fitted; and a plurality of ribs connecting the outer area and the inner area, and each of the ribs includes: a plurality of outer rib joints adjacent to the outer area; a plurality of outer rib portions adjacent to the outer area; a plurality of inner rib joints adjacent to the inner area; and a plurality of inner rib portions adjacent to the inner area. The outer rib portions are connected to the inner rib portions, and the total number of the inner rib joints is larger than the total number of the outer rib joints.

Advantageous Effects of Invention

The present invention provides a low-cost rotor for a rotating electric machine that has a wide interference to withstand high-speed rotation and large lightening holes to reduce moment of inertial, and a rotating electric machine including the rotor.

Problems to be solved, structures, and advantageous effects other than the above will be clarified in the following description of the embodiments of the present invention.

DESCRIPTION OF EMBODIMENTS

The embodiments of the present invention will described below with reference to the accompanying drawings.

Embodiment 1

Figure 2:
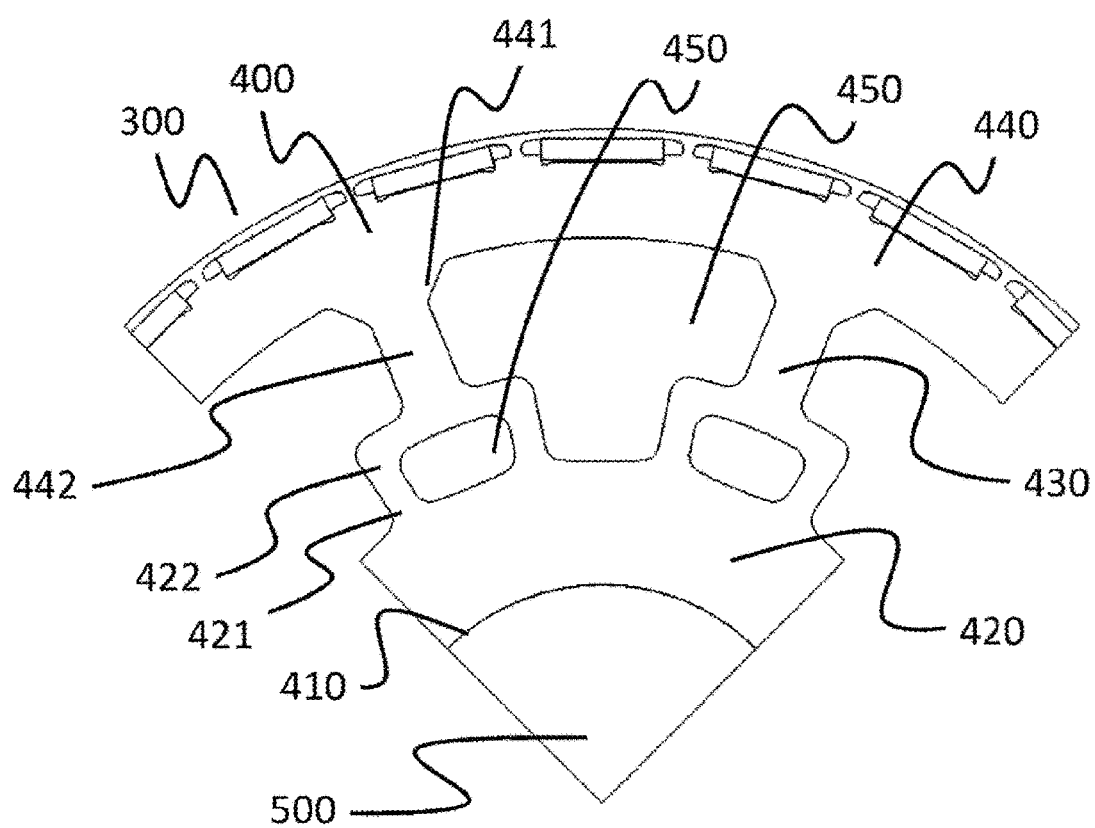
FIG. 2 is a cross-sectional view of the rotor according to Embodiment 1 (only 90°).

An embodiment of the present invention will now be described with reference to FIGS. 2 and 8. FIG. 2 is a cross-sectional view of the rotor of the present embodiment (only 90°), and FIG. 8 is a cross-sectional view of a rotating electric machine including the rotor of the present embodiment.

Figure 8:
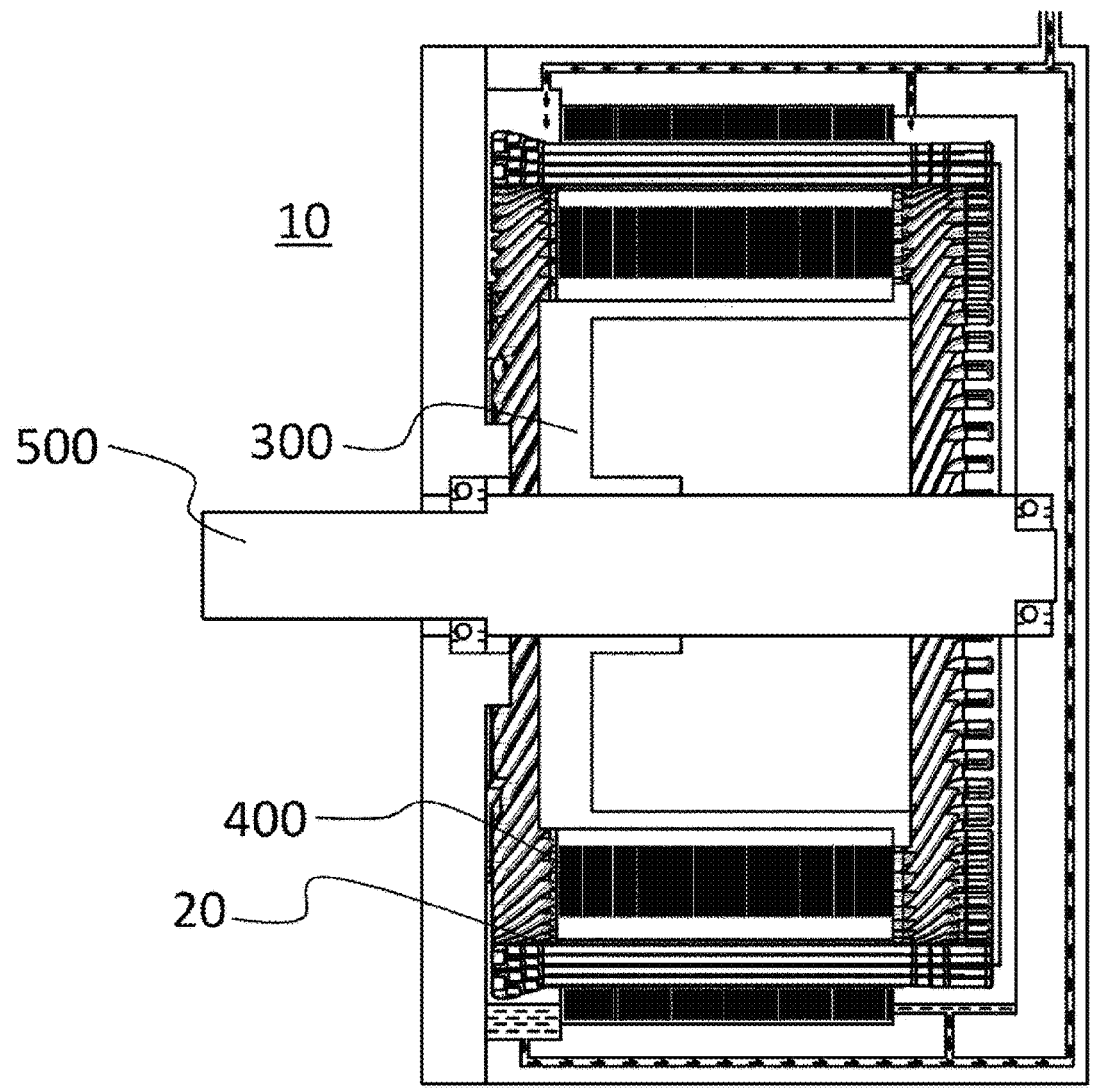
FIG. 8 is a cross-sectional view of a rotating electric machine including a rotor according to the present invention.

As illustrated in FIG. 8, a rotating electric machine 10 includes a stator 20 and a rotor 300. The rotor 300 includes a rotor iron core 400 and a shaft 500. The rotor iron core 400 is made of a stack of flat rolled magnetic steel sheets.

As illustrated in FIG. 2, the rotor iron core 400 has a shaft hole 410 at the center. The shaft 400 is press fitted in the shaft hole 410. The rotor iron core 400 includes an inner area 420 surrounding the shaft hole 410, a plurality of lightening holes 450 surrounding the inner area 420, an outer area 440 surrounding the lightening holes 450, and a plurality of ribs 430 connecting the inner area 420 and the outer area 440.

Each of the ribs 430 includes an outer rib joint 441 adjacent to the outer area, an outer rib portion 442 adjacent to the outer area, an inner rib joint 421 adjacent to the inner area, and an inner rib portion 422 adjacent to the inner area. The outer rib portions 442 are connected to the inner rib portions 422 and the total number of the inner rib joints 421 is larger than that of the outer rib joints 441.

The above structure having a larger total number of the inner rib joints than that of the outer rib joints has the number of the distributed inner rib portions necessary for reducing the maximum stress.

Figure 1:
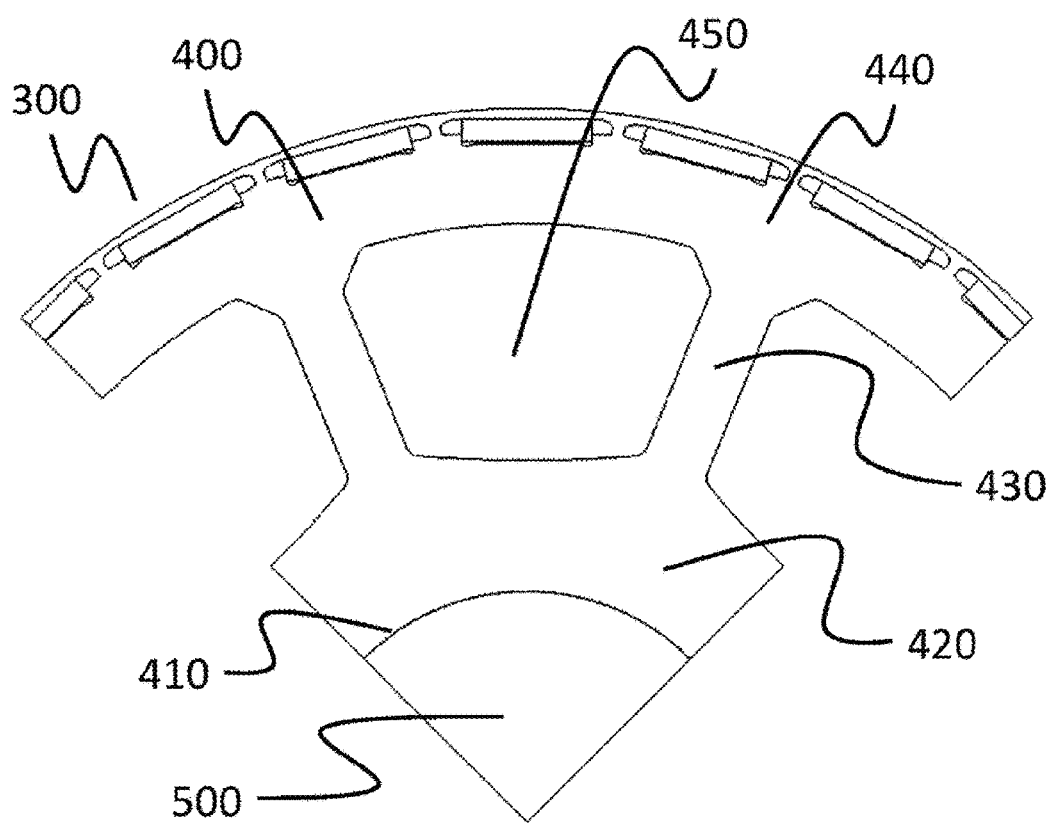
FIG. 1 is a cross-sectional view of a rotor of a typical rotating electric machine (only 90°).
Figure 3:
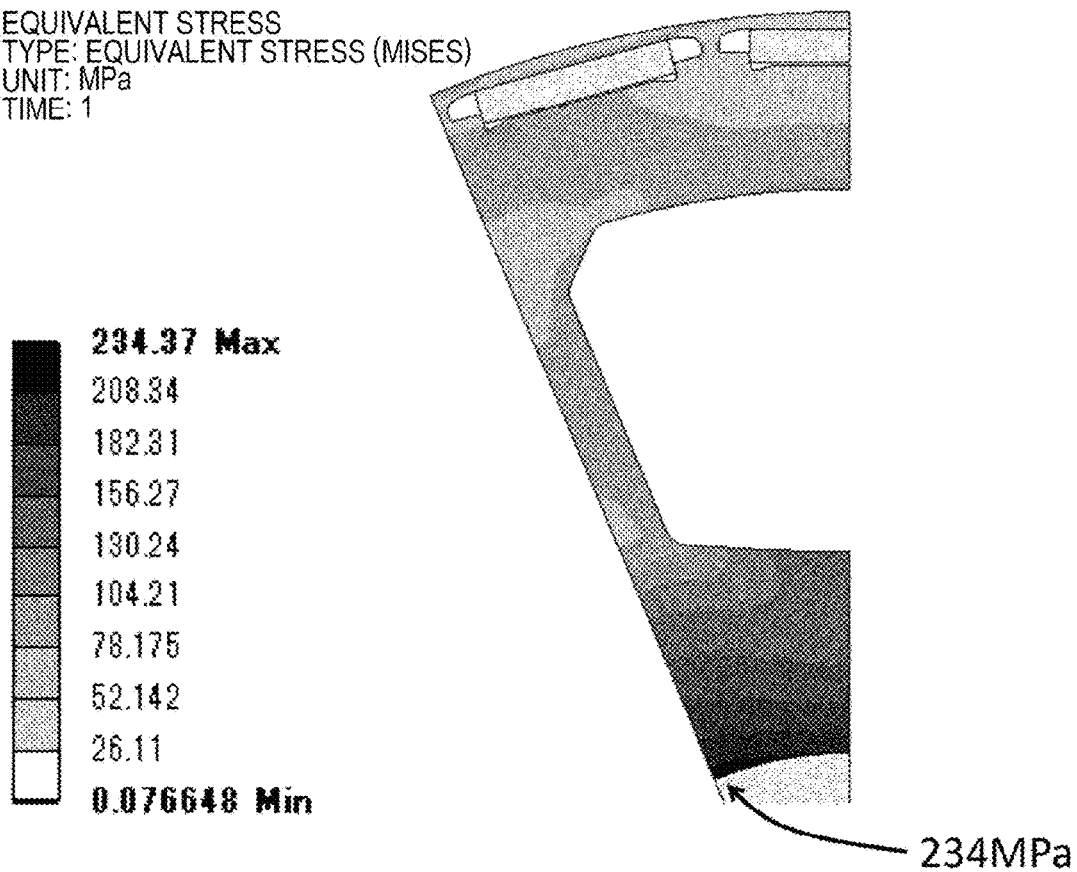
FIG. 3 is a press-fit stress distribution chart of the rotor iron core of FIG. 1 (only 22.5°).
Figure 4:
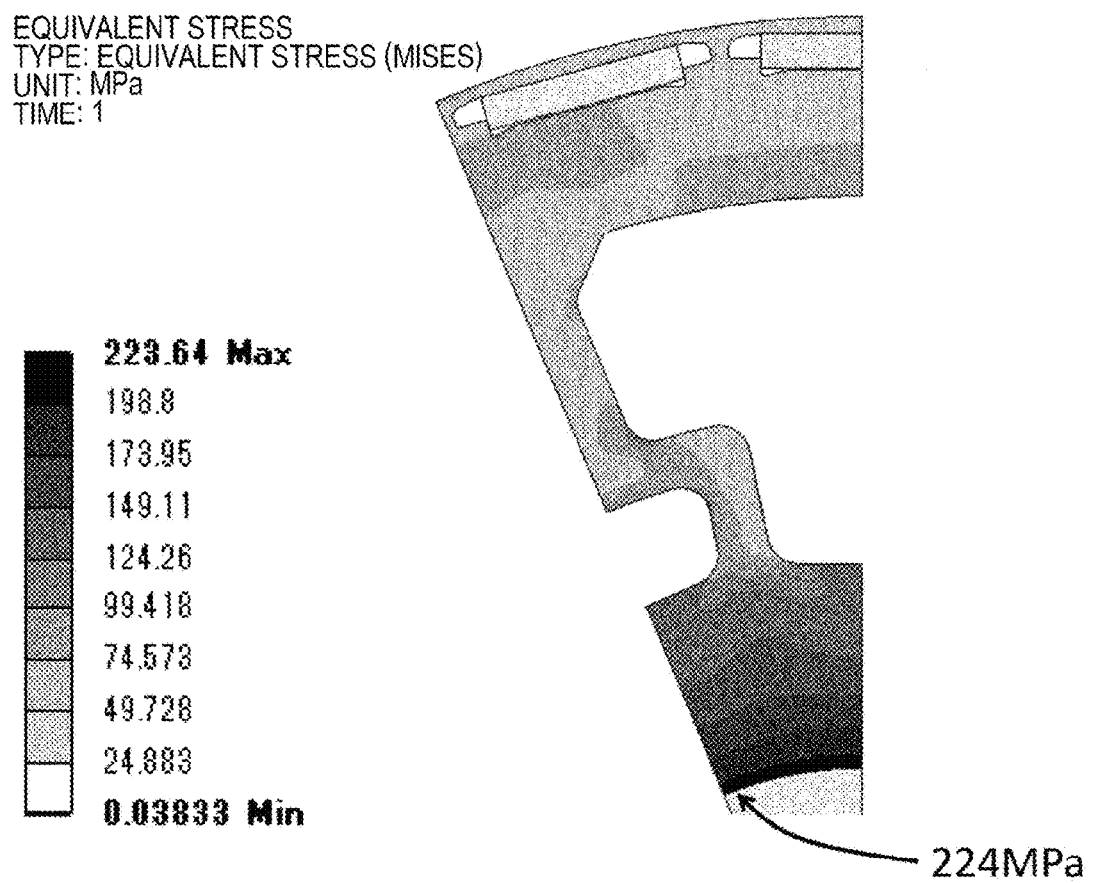
FIG. 4 is a press-fit stress distribution chart of the rotor iron core of FIG. 2 (only 22.5°).

The reduction in the maximum stress will now be described with reference to FIGS. 3 and 4. FIG. 3 is a stress distribution chart of the rotor iron core of the conventional art of FIG. 1 when the rotor iron core is subjected to the press fit with a certain interference. In this case, the maximum stress is 234 (MPa). FIG. 4 is a stress distribution chart of the rotor iron core of FIG. 2 when the rotor iron core is subjected to the press fit with the same interference. In this case, the maximum stress is 224 (MPa). The maximum stress of FIG. 4 is 96% of the maximum stress of FIG. 3. Since the maximum stress can be cut by 4%, the rotor of the present embodiment can have a wider interference to withstand high-speed rotation. The rotor of the present embodiment can also have larger lightening holes broadening in the inner area to reduce moment of inertia. The rotor of the present embodiment achieves the object of the present invention without the extra costs for using high-strength material.

Embodiment 2

Another embodiment of the present invention will now be described with reference to FIG. 5.

Different from Embodiment 1 (FIG. 2), if each of the outer rib portions 442 extends from the outer area 440 to the inner area 420 and has a part substantially parallel to the radial direction and if each of the inner rib portions 422 extends from the inner area 420 to the outer side 440 and is inclined from the radial direction to the circumferential direction, the rotor with such a structure further reduces moment of inertia. This modified embodiment is illustrated in FIG. 5.

Figure 5:
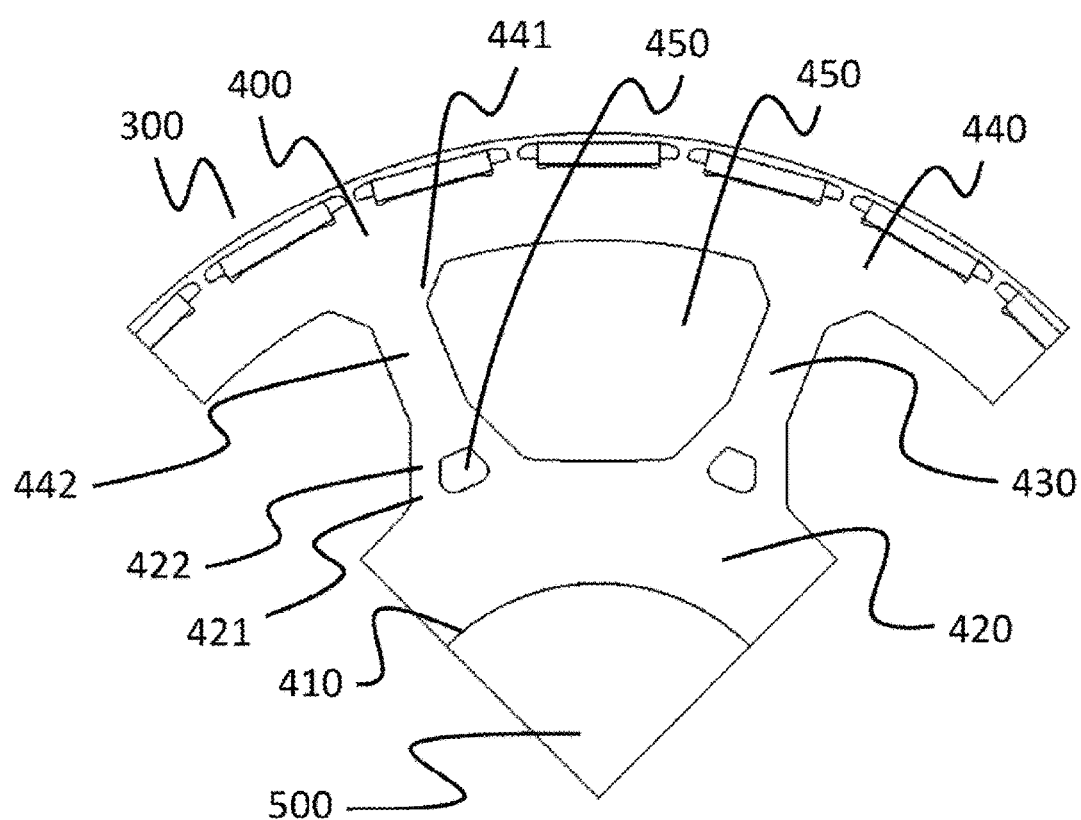
FIG. 5 is a cross-sectional view of the rotor according to Embodiment 2 (only 90°).

As illustrated in FIG. 5, since each of the inner rib portions 422 extends from the inner area 420 to the outer area 440 and is inclined from the radial direction to the circumferential direction, the rotor of Embodiment 2 further reduces moment of inertia compared to Embodiment 1 (FIG. 2). The modification in the shape of the inner rib portions 422 from FIG. 2 hardly affects the maximum stress around the internal circumference of the rotor iron core, which ensures the reduction in the maximum stress compared to Embodiment 1 (FIG. 2).

Embodiment 3

Another embodiment of the present invention will now be described with reference to FIG. 6.

Different from Embodiment 2 (FIG. 5), if each of the outer rib portions 442 has a linear part 443 substantially parallel to the radial direction, if each of the inner rib portions 422 is substantially linear, and if the width of the linear part of each outer rib portion 432 is narrower than the total width of the inner rib portions 422, the rotor with such a structure further reduces moment of inertia. This modified embodiment is illustrated in FIG. 6.

Figure 6:
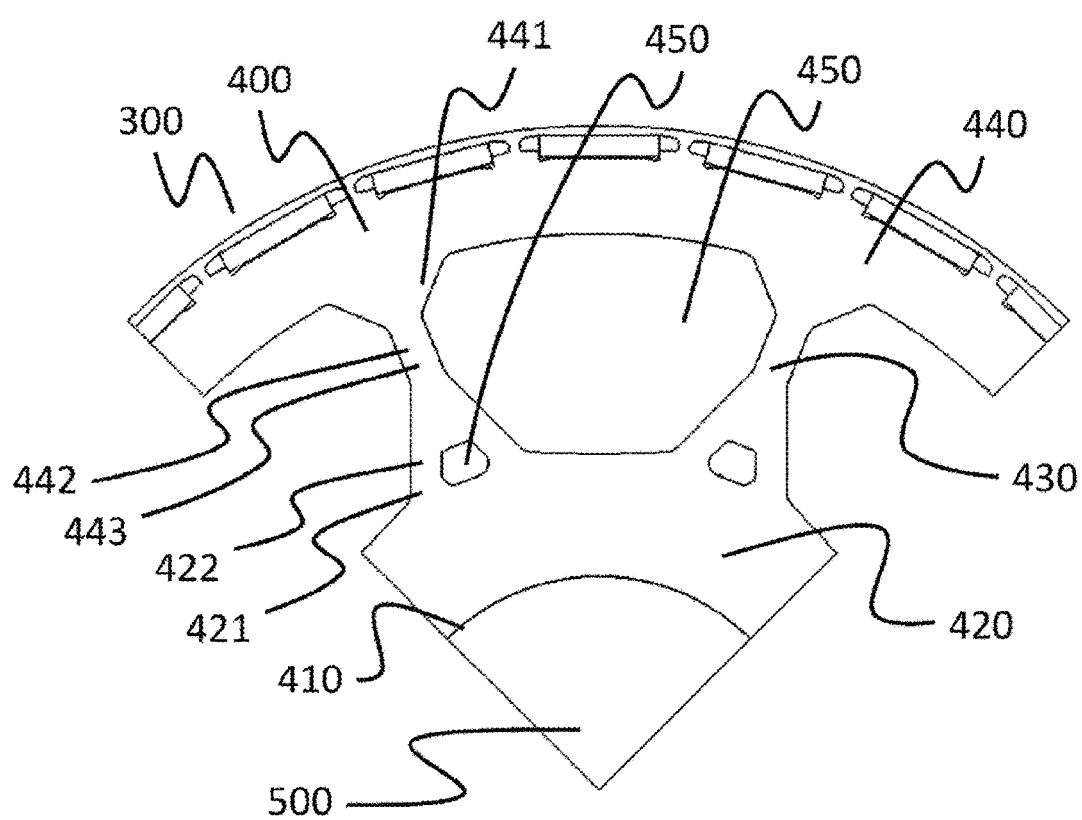
FIG. 6 is a cross-sectional view of the rotor according to Embodiment 3 (only 90°).

As illustrated in FIG. 6, since the width of the linear part of each outer rib portion 432 is narrower than the total width of the inner rib portions 422, the rotor of Embodiment 3 further reduces moment of inertia compared to Embodiment 2 (FIG. 5). The modification in the shape of the outer rib portions 442 from FIG. 5 hardly affects the maximum stress around the internal circumference of the rotor iron core, which ensures the reduction in the maximum stress compared to the shape of FIG. 1.

Embodiment 4

Another embodiment of the present invention will now be described with reference to FIG. 7.

Different from Embodiment 3 (FIG. 6), if the substantially linear part 443 of each outer rib portion 442 is connected to two inner rib portions 422 and if the two inner rib portions 422 and the inner area 420 form a substantially triangle hole, the rotor with such a structure further reduces moment of inertia. This modified embodiment is illustrated in FIG. 7.

Figure 7:
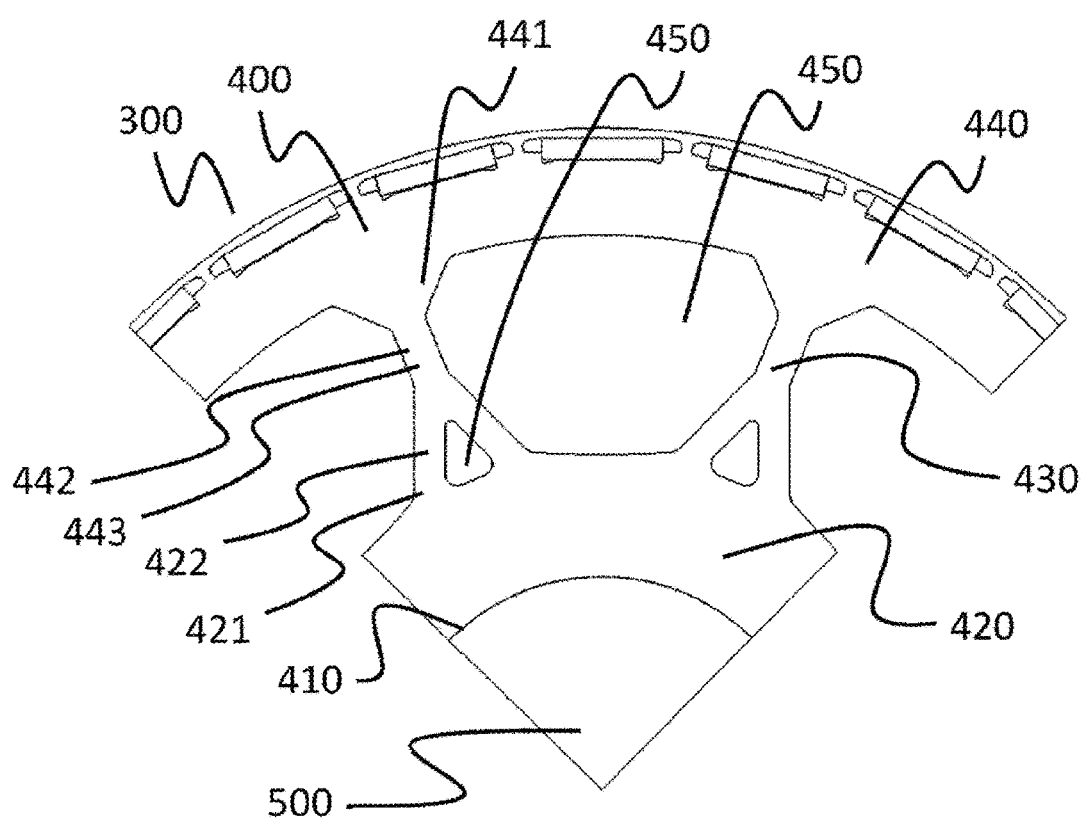
FIG. 7 is a cross-sectional view of the rotor according to Embodiment 4 (only 90°).

As illustrated in FIG. 7, since two inner rib portions 422 and the inner area 420 form a substantially triangle hole, the rotor of Embodiment 4 further reduces moment of inertia compared to Embodiment 3. The modification in the shape of the inner rib portions from FIG. 6 hardly affects the maximum stress around the internal circumference of the rotor iron core, which ensures the reduction in the maximum stress compared to the shape of FIG. 1.

In any of the above embodiments, the number of the outer rib portions in one rib is not determined. One rib may have one outer rib portion, two outer rib portions, or three or more outer rib portions as long as the total number of the inner rib joints is larger than that of the outer rib joints.

In any of the above embodiments, the number of the inner rib portions in one rib is not determined. One rib may have two inner rib portions, three inner rib portions, or four or more inner rib portions as long as the total number of the inner rib joints is larger than that of the outer rib joints.

In any of the above embodiments, the description about positioning holes for assembly is not included. Positioning holes are generally made near outer rib joints; however, these positioning holes are only needed for assembly and do not affect the stress around the internal circumference of the rotor iron core with the shaft press fitted therein. Positioning holes are thus not regarded as structural elements of the outer rib joints in the present invention. The number of the outer rib joints is not changed due to the presence or absence of positioning holes.

In any of the above embodiments, the type of the rotating electric machine is not determined. The rotating electric machine may be a permanent-magnet type rotating electric machine, an induction motor, or any other rotating electric machine.

In the above embodiments, a rotor of a rotating electric machine for an electric vehicle is took as an example. A rotating electric machine for an electric vehicle is especially required to withstand high-speed rotation and reduce moment of inertia. The application of the present invention is not limited to a rotating electric machine for an electric vehicle. The present invention can be applied to rotating electric machines for other purposes to obtain similar advantageous effects.

The present invention is not limited to the above embodiments and includes various modifications. The above embodiments are described in detail to clarify the present invention and are not necessarily limited to embodiments including all the described structural elements. Some of the structural elements of one embodiment can be replaced with the structural elements of another embodiment or the structural elements of one embodiment can be added to the structural elements of another embodiment. Some of the structural elements of one embodiment can be deleted in addition to the above addition or replacement.

REFERENCE SIGNS LIST 300 rotor
400 rotor iron core 410 shaft hole
420 inner area
421 inner rib joint
422 inner rib portion
430 rib
440 outer area
441 outer rib joint
442 outer rib portion
443 linear part substantially parallel to radial direction
450 lightening hole
500 shaft

The invention claimed is:

1. A rotor for a rotating electric machine, comprising:
a shaft and a rotor iron core, wherein the shaft being press fitted in the rotor iron core, the rotor iron core, comprising:
a shaft hole;
an outer area;
an inner area in which the shaft is press fitted; and
a plurality of ribs connecting the outer area and the inner area,
each of the ribs, comprising:
a plurality of outer rib joints adjacent to the outer area;
a plurality of outer rib portions adjacent to the outer area;
a plurality of inner rib joints adjacent to the inner area; and
a plurality of inner rib portions adjacent to the inner area,
wherein the outer rib portions are connected to the inner rib portions, and
wherein a total number of the inner rib joints is larger than a total number of the outer rib joints,
wherein each of the outer rib portions has a part substantially parallel to a radial direction, the part being substantially linear, wherein each of the inner rib portions is substantially linear, and wherein a width of a linear part of each outer rib portion is narrower than a total width of the inner rib portions.

2. The rotor for a rotating electric machine according to claim 1,
wherein each of the outer rib portions extends from the outer area to the inner area and has the part substantially parallel to the radial direction, and
wherein each of the inner rib portions extends from the inner area to the outer area and is inclined from the radial direction to the circumferential direction.

3. The rotor for a rotating electric machine according to claim 1,
wherein the substantially linear part of each outer rib portion is connected to two inner rib portions, and
wherein the two inner rib portions and the inner area form a substantially triangle hole.

4. A rotating electric machine, comprising:
the rotor for a rotating electric machine according to claim 1, and a stator.

5. A rotating electric machine, comprising:
the rotor for a rotating electric machine according to claim 2, and a stator.

6. A rotating electric machine, comprising:
the rotor for a rotating electric machine according to claim 3, and a stator.

* * * * *